(12) United States Patent
Bolden

(10) Patent No.: US 11,160,141 B2
(45) Date of Patent: Oct. 26, 2021

(54) PORTABLE HEATING UNIT

(71) Applicant: Arnel D. Bolden, Canton, MS (US)

(72) Inventor: Arnel D. Bolden, Canton, MS (US)

(*) Notice: Subject to any disclaimer, the term of this patent is extended or adjusted under 35 U.S.C. 154(b) by 254 days.

(21) Appl. No.: 15/878,141

(22) Filed: Jan. 23, 2018

(65) Prior Publication Data

US 2018/0213605 A1 Jul. 26, 2018

Related U.S. Application Data

(60) Provisional application No. 62/449,326, filed on Jan. 23, 2017.

(51) Int. Cl.
*H05B 3/00* (2006.01)
*H05B 3/06* (2006.01)
*H01M 8/04007* (2016.01)
*H01M 10/0525* (2010.01)

(52) U.S. Cl.
CPC .......... *H05B 3/06* (2013.01); *H01M 8/04007* (2013.01); *H01M 10/0525* (2013.01); *H01M 2220/30* (2013.01); *H05B 2203/032* (2013.01)

(58) Field of Classification Search
CPC ........ H05B 2203/002; H05B 2203/032; H05B 3/06; H01M 10/0525; H01M 8/04007; F23Q 1/06; A61L 9/122; A61L 2209/12; A61L 9/04; A61L 9/03
USPC ................ 219/533; 431/144, 289, 291, 145; 362/96, 392, 161
See application file for complete search history.

(56) References Cited

U.S. PATENT DOCUMENTS

| 589,173 | A | * | 8/1897 | Henke | F21V 35/00 40/441 |
|---|---|---|---|---|---|
| 1,686,579 | A | * | 10/1928 | Staats | F23Q 7/16 219/262 |
| 2,154,803 | A | * | 4/1939 | Banecroft | A61L 9/03 422/126 |
| 2,237,523 | A | * | 4/1941 | Damon | F21V 35/00 431/151 |
| 2,860,224 | A | * | 11/1958 | Tammen | F24C 7/10 219/452.13 |
| 4,757,183 | A | * | 7/1988 | Karey | A45D 20/10 392/341 |
| 4,781,895 | A | * | 11/1988 | Spector | A01M 1/2088 261/DIG. 88 |
| 5,032,360 | A | * | 7/1991 | Houston | A61L 9/03 422/4 |
| 5,114,625 | A | * | 5/1992 | Gibson | A61L 9/122 261/102 |
| 5,793,019 | A | * | 8/1998 | Boyle | F26B 3/283 219/400 |
| 5,827,483 | A | * | 10/1998 | Fullam | F21V 17/00 422/122 |
| 5,873,178 | A | * | 2/1999 | Johnson | A47K 10/48 34/90 |
| 6,144,801 | A | * | 11/2000 | Lehoux | A61L 9/03 239/135 |

(Continued)

*Primary Examiner* — Charles P. Cheyney
(74) *Attorney, Agent, or Firm* — Michael C. Williams; Bradley Arant Boult Cummings LLP

(57) ABSTRACT

The present invention provides a novel method and apparatus for providing radiant heat for a small area. The invention provides the desired warmth, in a small, portable pod that does not produce gaseous odors or unwanted sounds, providing a safe, effective alternative to traditional space heaters.

10 Claims, 13 Drawing Sheets

(56) References Cited

U.S. PATENT DOCUMENTS

| | | | | |
|---|---|---|---|---|
| 6,231,336 | B1* | 5/2001 | Chen | F21V 35/00 362/163 |
| 6,328,935 | B1* | 12/2001 | Buccellato | A61L 9/03 422/123 |
| 7,226,284 | B2* | 6/2007 | Avelar | F21S 13/00 431/150 |
| 7,252,805 | B2* | 8/2007 | Hart | A01M 1/2066 122/366 |
| 7,670,035 | B2* | 3/2010 | Tsai | F21S 9/02 362/392 |
| 8,053,709 | B2* | 11/2011 | Vandrak | F21V 33/00 219/501 |
| 8,723,086 | B2* | 5/2014 | McMahan | H05B 3/0076 219/533 |
| 8,783,888 | B2* | 7/2014 | McCavit | F21V 17/00 362/96 |
| 9,059,589 | B2* | 6/2015 | Wilson | H02J 7/0042 |
| 9,211,355 | B2* | 12/2015 | Thompson | A61L 9/03 |
| 9,551,470 | B2* | 1/2017 | Li | F21S 6/001 |
| 2002/0090317 | A1* | 7/2002 | Hardy | A61L 9/014 422/5 |
| 2009/0200393 | A1* | 8/2009 | Avelar | A61L 9/03 239/60 |
| 2011/0110072 | A1* | 5/2011 | Hsiao | A61L 9/03 362/96 |
| 2013/0039639 | A1* | 2/2013 | Carney | B01D 1/0011 392/386 |
| 2014/0370450 | A1* | 12/2014 | Sharma | A01M 1/2088 431/288 |
| 2015/0342172 | A1* | 12/2015 | Sharma | A01M 1/2088 43/124 |
| 2018/0042070 | A1* | 2/2018 | Belongia | H05B 3/0052 |
| 2018/0071424 | A1* | 3/2018 | Kong | A61L 2/0023 |

\* cited by examiner

PORTABLE HEATING UNIT

CROSS-REFERENCE TO RELATED APPLICATIONS

This application claims priority to and the benefit of U.S. Provisional Application No. 62/449,326, filed 23 Jan. 2017 titled "Portable Heating Unit". All of the foregoing application(s) are incorporated herein by reference in their entireties.

BACKGROUND

A. Field of the Disclosure

The present disclosure relates generally to portable device designed to provide warmth for a small area where other forms of heating may not be suitable or accessible. Such devices as well as methods for use therewith are provided.

B. Background

Staying warm outdoors during winter months is often a difficult task in many areas for many people. Portable, personal heaters are well-known in the art and are not uncommon; however, many have their own deficiencies. Despite the fact that there are a number of devices designed to produce heat for a small area, many produce gaseous fumes, loud, disturbing noises or often present a safety hazard. The aforementioned deficiencies are also troublesome in small enclosed areas such as an office, enclosed golf cart, or spaces that prohibit traditional portable heaters. Furthermore, this is also not ideal for situations where the individual, or his or her surroundings, is sensitive to noise and smells i.e. hunting which takes place outdoors during the winter months.

If an individual is outdoors hunting an animal sensitive to foreign odors, or unfamiliar sounds, a device that achieves the desired warmth without the detrimental by-products is essential to the hunting experience. In fact, it could ultimately be the difference between capturing the trophy game, or returning to the cabin empty-handed after hours of sitting in below-freezing weather. In addition to the need for warmth while hunting, a portable heating device, particularly one that can be inserted into a cup holder, is useful for a security guard patrolling a parking lot in the winter months, or a golfer on a cool spring or fall afternoon. Ideally, one would prefer a small, portable heating device that 1) produces a sufficient amount of heat to cover a defined area; 2) has no need for an external power source i.e. electricity; 3) does not emit any gaseous odors or $CO_2$ by-product; and 4) produces little to no sound. Such device is disclosed herein.

SUMMARY

The applications described above are accomplished by the device described in this disclosure, although it is to be understood that not all such applications will be accomplished by every embodiment of the device.

The device is a safe and portable device that can be used to warm small areas, comprising: an outer shell, a lid, and a heating assembly. The outer shell is further comprised of an upper and lower chamber wherein the lower chamber also contains a detachable base. Enclosed in the outer shell is the heating assembly, comprised of a safety dome, a dampening unit, a fuel cell unit, a fuel cell holder, a fan assembly, and a battery source. Lastly, the lid serves a dual purpose as it is attached the upper chamber of the outer shell to cover the safety dome when not in use, or in the alternative, the lid may be placed on the base of the lower chamber to serve as a stabilizing unit.

The foregoing presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

DETAILED DESCRIPTION

Definitions

Figure 1:
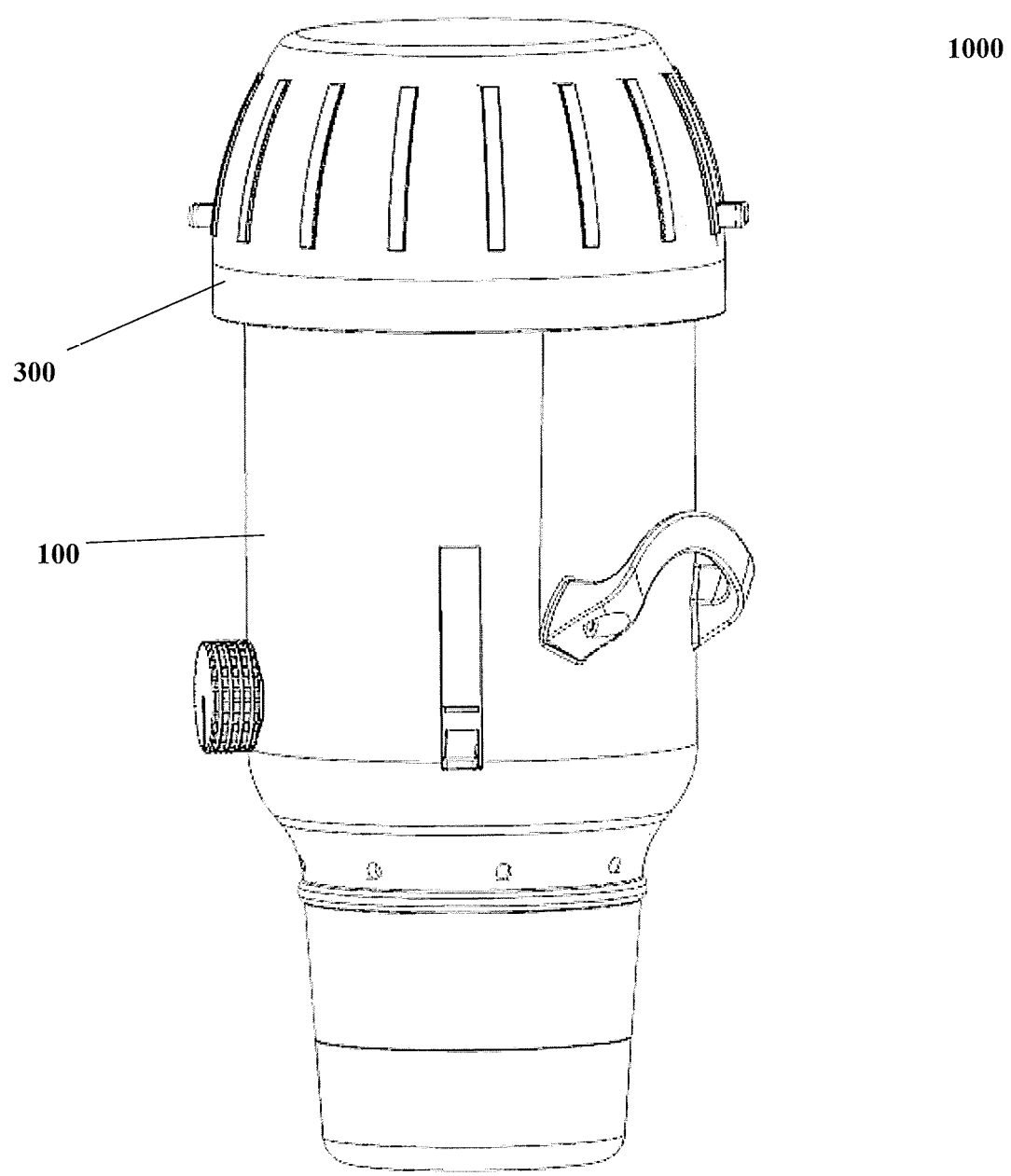
FIG. 1 shows a side view of the portable heating unit with the lid attached.
Figure 2:
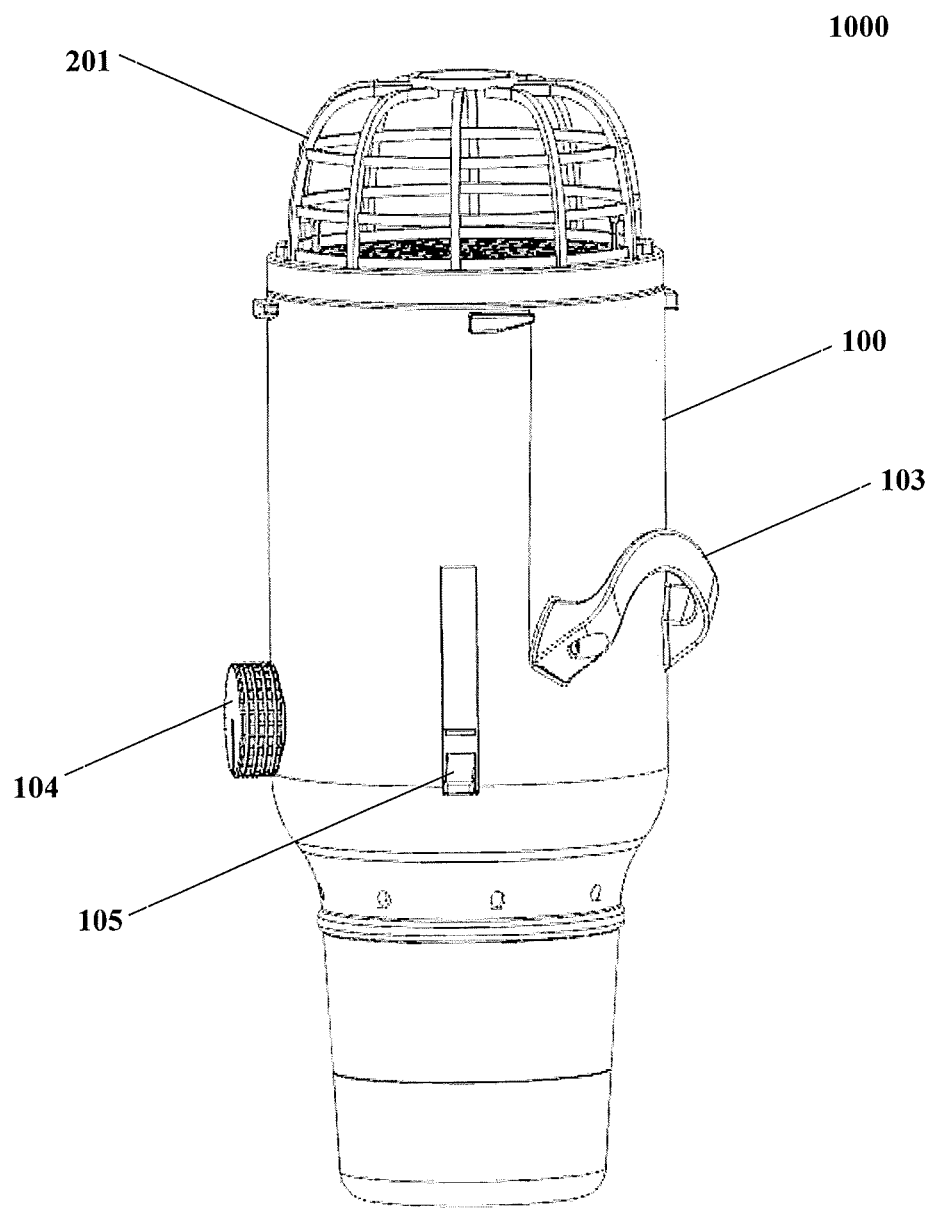
FIG. 2 shows a side view of the portable heating unit with the lid removed.
Figure 3:
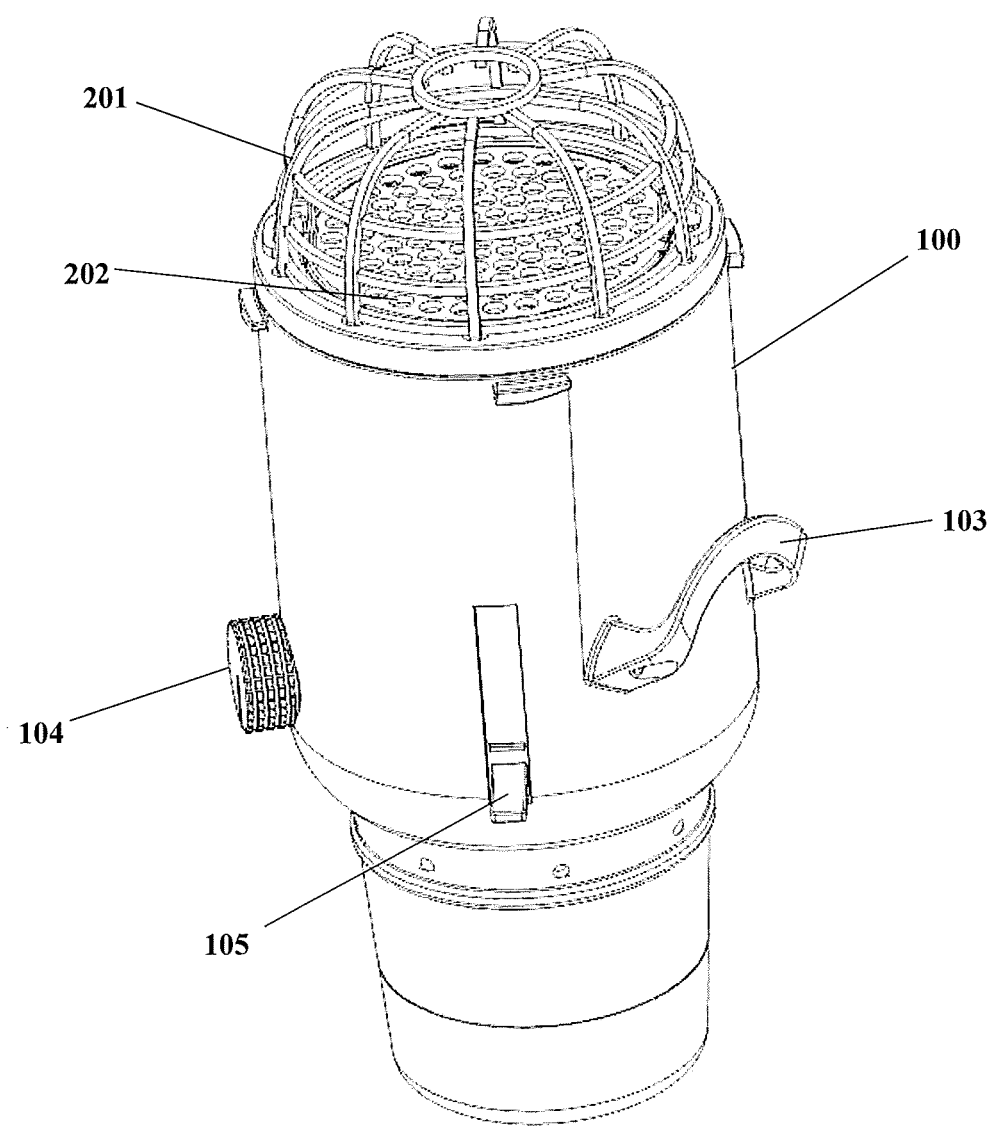
FIG. 3 shows an isometric view of the portable heating unit with the lid removed.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting. As used herein, the singular forms "a", "an" and "the" are intended to include the plural forms as well, unless the context clearly indicates otherwise.

Spatially relative terms, such as "under", "below", "lower", "over", "upper" and the like, may be used herein for ease of description to describe one element or feature's relationship to another when the apparatus is right side up.

The terms "first" and "second" are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

With reference to the use of the words "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and the following claims.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. Importantly, this term excludes such other elements that adversely affect the operability of what is claimed for its intended purpose as stated in this disclosure, even if such other elements might enhance the operability of what is claimed for some other purpose.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given herein are approximate unless stated otherwise, meaning that the term "about" or "approximately" can be inferred when not expressly stated.

Portable Heating Unit

In one embodiment, the present disclosure provides a portable heating unit 1000 that is useful in producing radiant heat without producing undesired odors, fumes, noises, and does not require an external power source for primary use outdoors. For example, when the individual is outdoors during deer season in freezing weather, the individual may light the portable heating unit 1000 to radiate heat for warmth, without producing unwanted odors that may dissuade or deter potential game. Additionally, the user may place the portable heating unit 1000 in a cup holder for use within a golf cart or device of the like. In the embodiment shown in FIGS. 1-3 and FIG. 15-16, the portable heating unit 1000 comprises: an outer shell 100, a heating assembly 200, a lid 300, and a power source 400.

Figure 4:
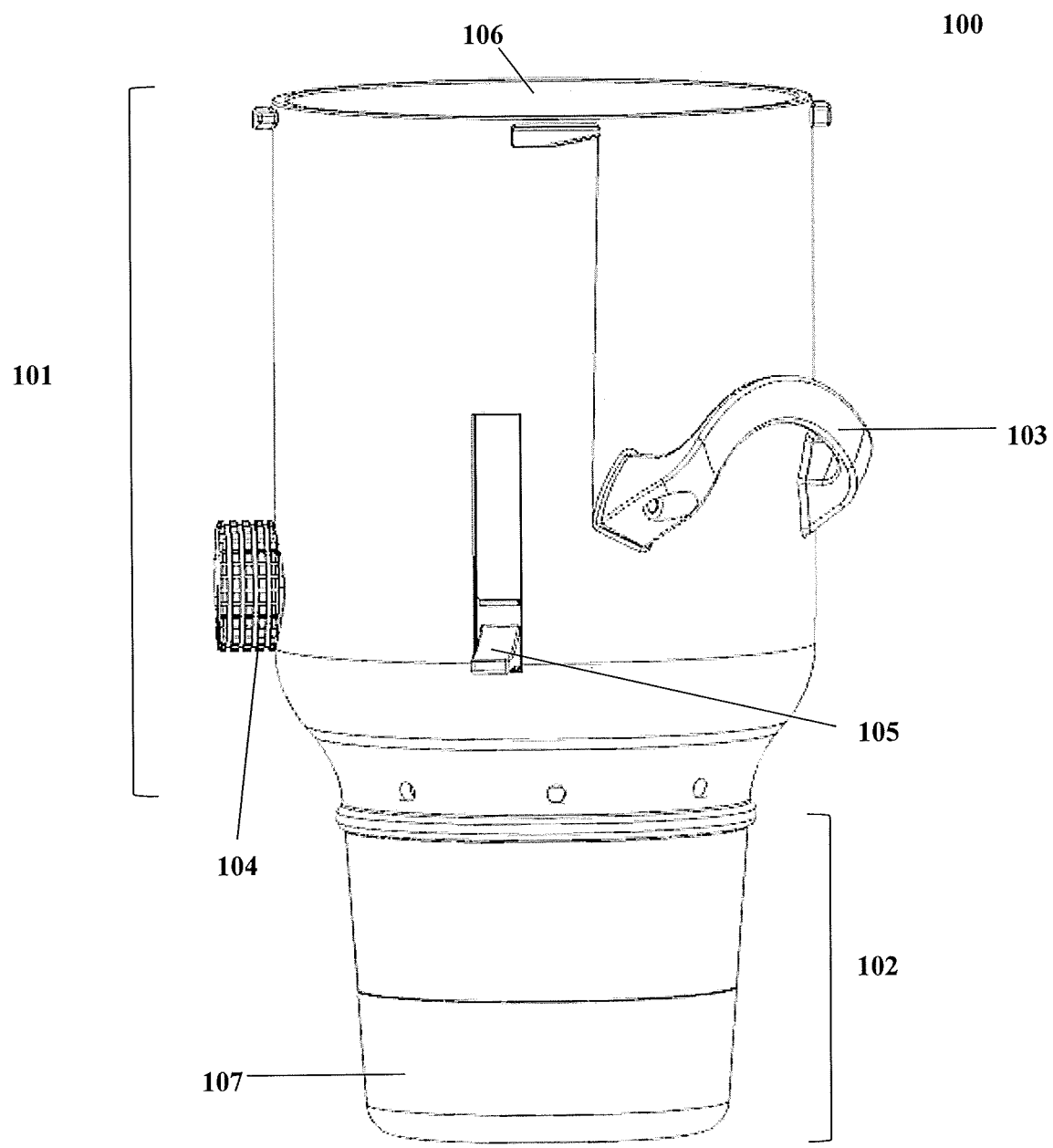
FIG. 4 shows a side view of the outer shell of the portable unit.

The outer shell 100 of the portable heating unit 1000 is comprised of an upper chamber 101 and a lower chamber 102. As shown in FIG. 4, the outer shell 100 provides the outer shape and barrier of the portable heating unit 1000 and houses the heating assembly 200 in its upper chamber 101. Other shapes should be considered within the scope of this disclosure including, but not limited to, three dimensional figures in which the bottom surface is flat. Said outer shell 100 also has a height and diameter. The height and diameter may vary and does not require a specific ratio in relation to one another. The upper chamber 101 may be a hollow cylinder, or any hollow three dimensional figure larger in diameter than the lower chamber 102. Likewise, the upper chamber 101 must be large enough house the heating assembly 200. The lower chamber 102, too, may be a hollow cylinder or any hollow three dimensional figure with a smaller diameter than the upper chamber 101. The outer shell 100 may be made of any of the following materials including, but not limited to, a ceramic material e.g. silicone or material of the like. Additionally, the lower chamber 102 also contains a base 107 that is detachable. The base 107 is attached to the lower chamber 102 via mated threading 108 located on interior of the base 107 and the exterior of the lower chamber 102 respectively. The base 107 also houses the power source 400. The power source 400 can be a number of power sources as long as the power source 400 can store and produce sufficient power to supply to the internal fan assembly 205 without the need of an outlet. This may be a traditional AA battery, or rechargeable lithium ion battery charged by a USB port or port of the like. However, in the event an outlet is needed, the portable heating unit 1000 may be fitted with a USB port 109 for external power.

Figure 5:
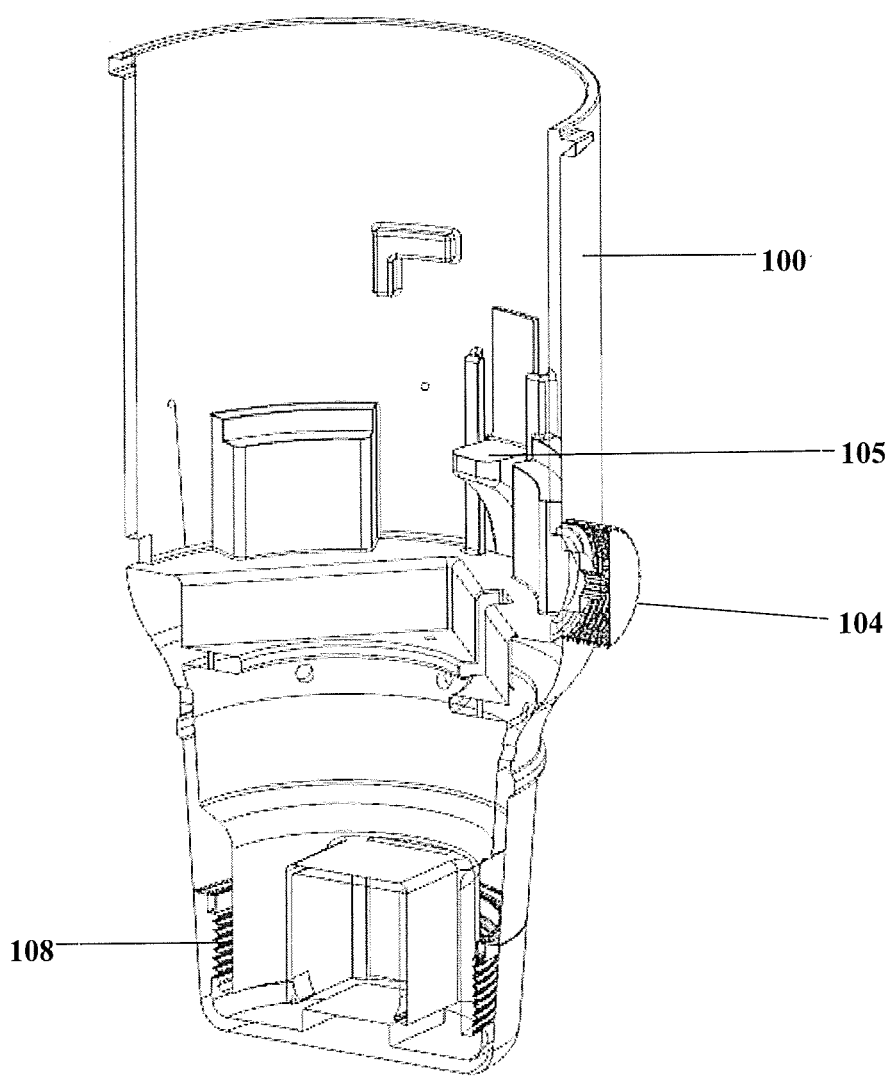
FIG. 5 shows a cross sectional view of the outer shell of the portable unit.
Figure 16:
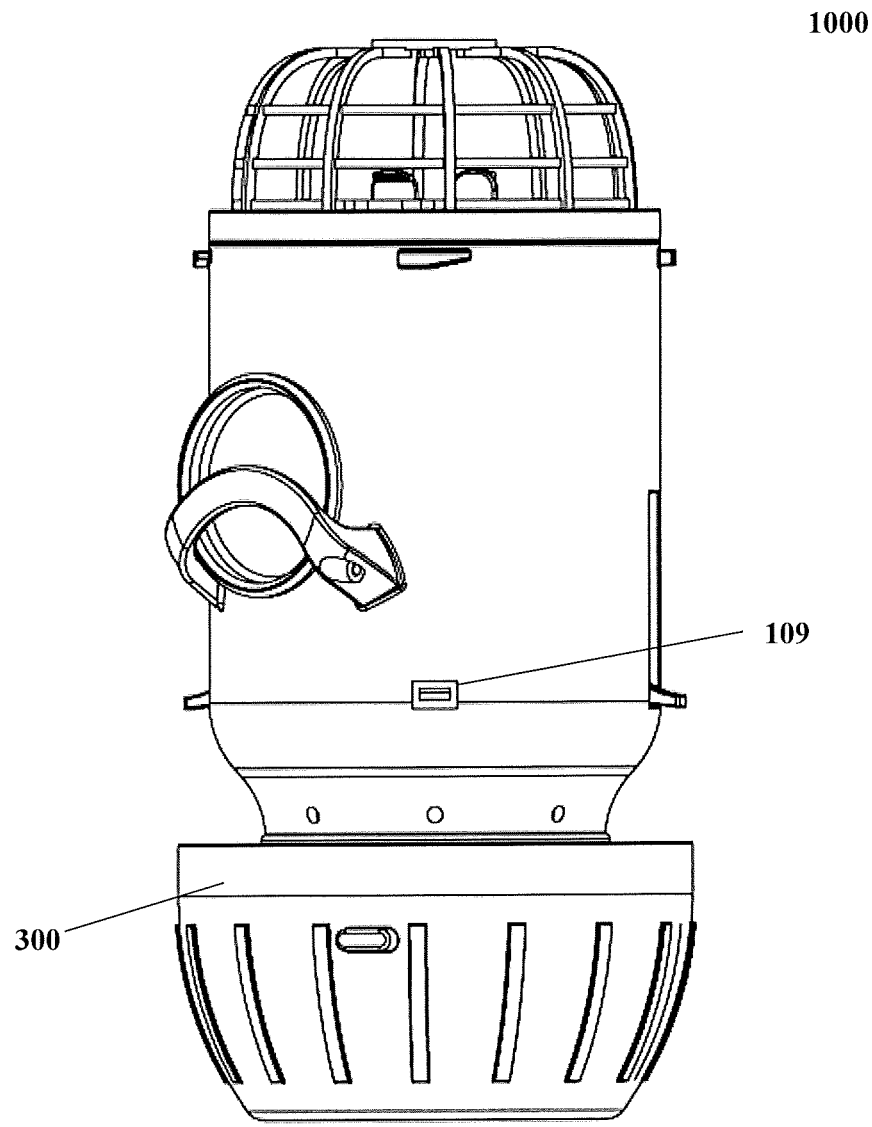
FIG. 16 shows a side view of the portable heating unit with the lid used as a stabilizing unit.

As shown in FIGS. 4 and 5, located on the upper chamber 101 of the portable heating unit 1000 is a knob or tuner 104, a lifting component 105, and a holder 103. The knob or tuner 104 is responsible adjusting the speed of the internal fan assembly 205 described in more detail below. Furthermore, the lifting component 105 is responsible for adjusting the depth of the fuel cell unit 204. The use may raise or lower the height of the fuel cell unit 204 to provide more or less heat by sliding the lifting component 105 vertically. Lastly, the outer shell 100 contains a holder 103 which provides a storage place for the top of the fuel cell unit 204 container as shown in FIG. 16.

Figure 6:
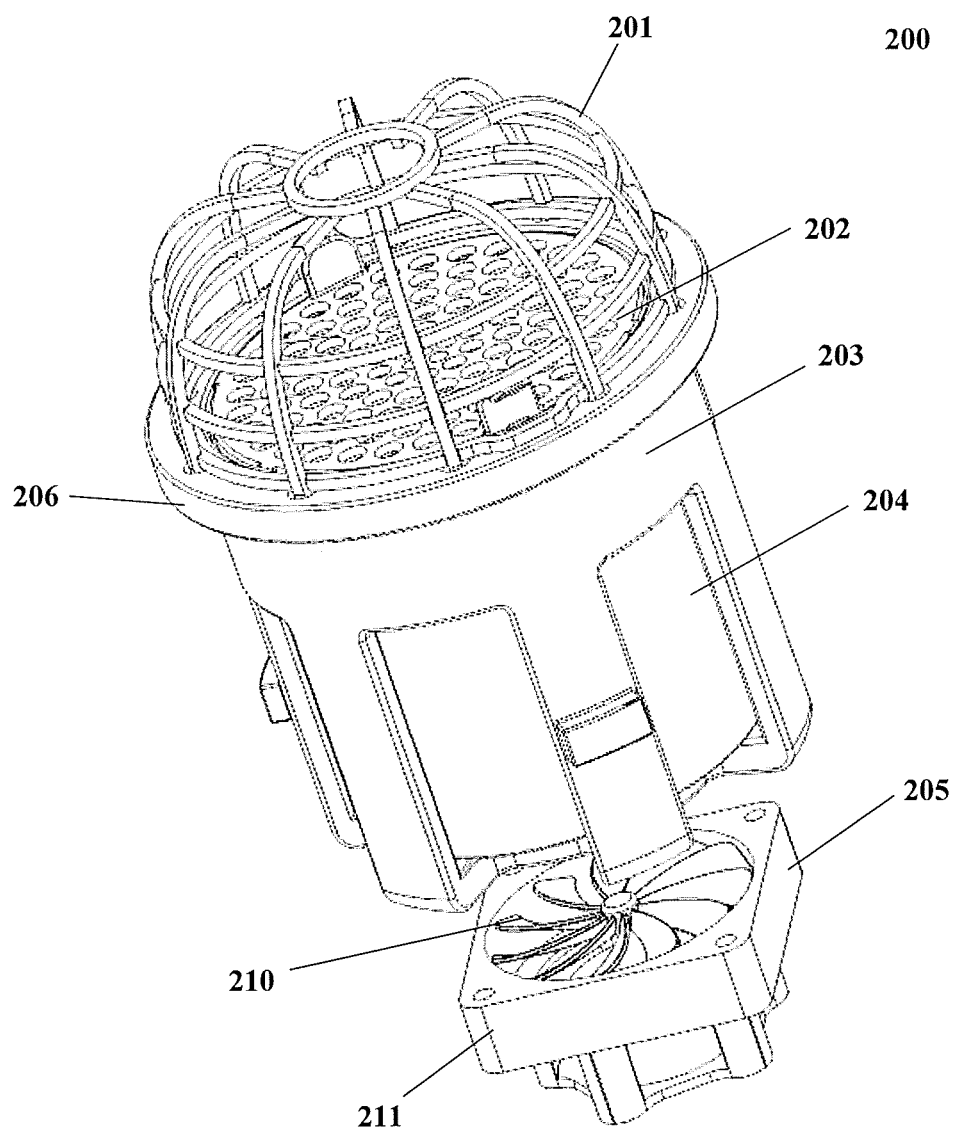
FIG. 6 shows an isometric view of the heating assembly.
Figure 7:
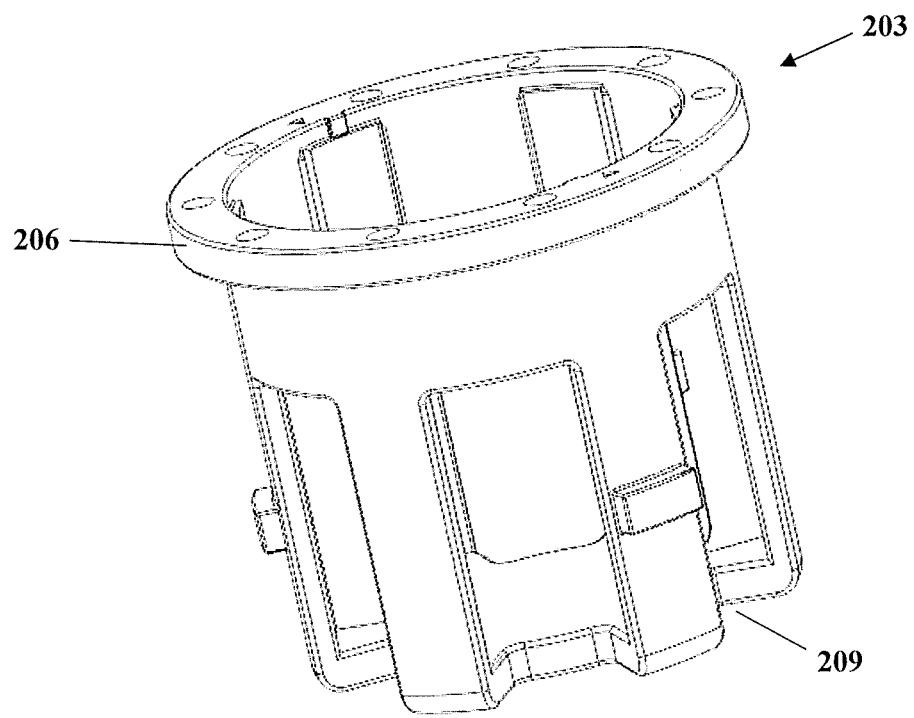
FIG. 7 shows an isometric view of the fuel cell holder.
Figure 8:
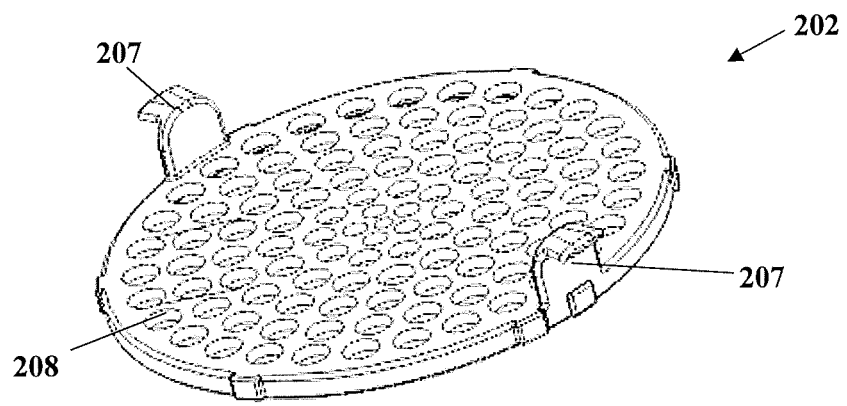
FIG. 8 shows an isometric view of the dampening unit.
Figure 9:
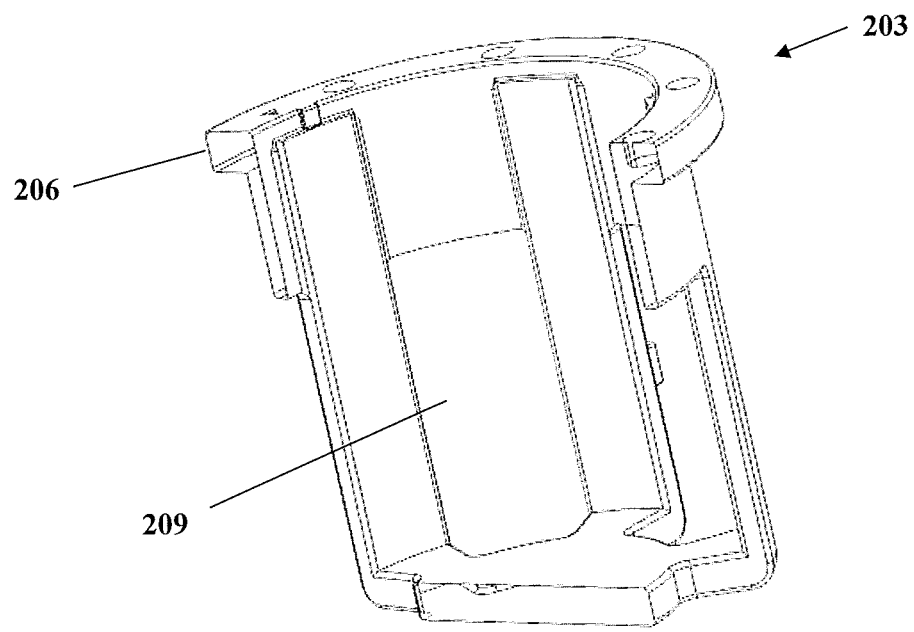
FIG. 9 shows a cross sectional view of the fuel cell holder.
Figure 10:
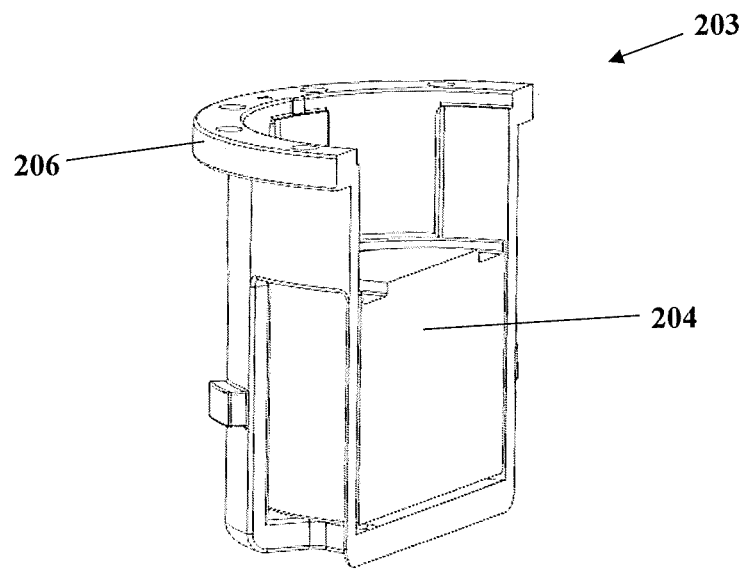
FIG. 10 shows a cross sectional view of the fuel cell holder with the fuel cell inserted.
Figure 11:
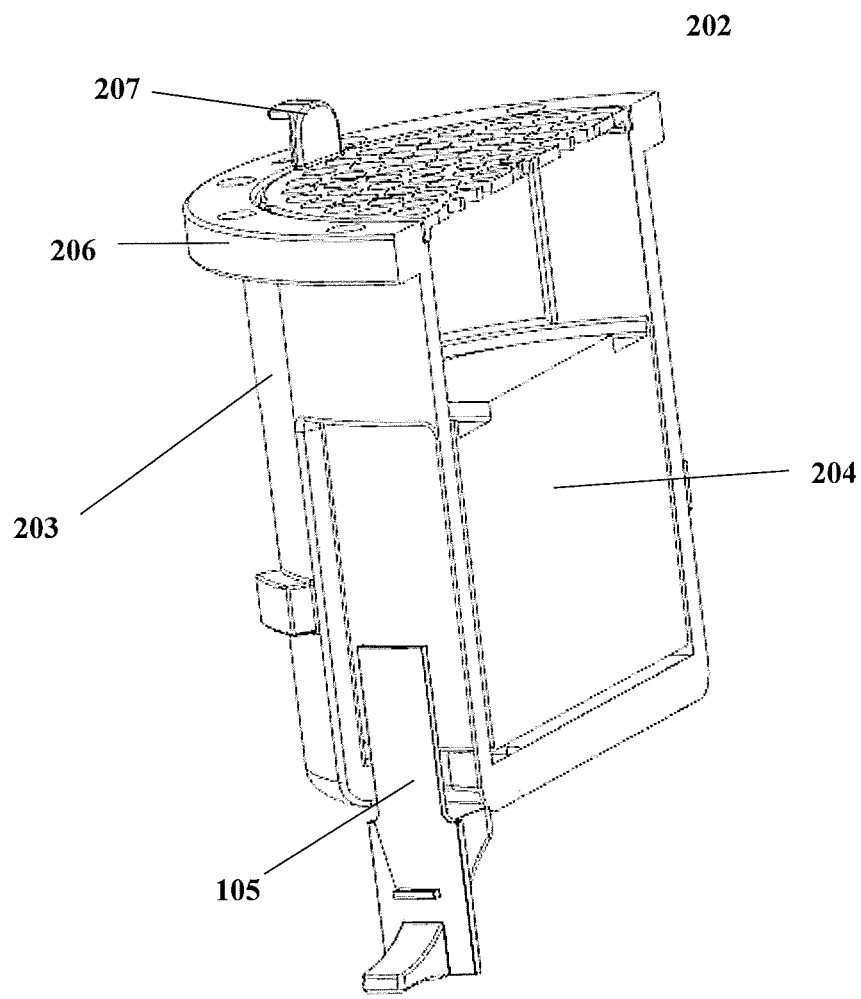
FIG. 11 shows a cross sectional view of the dampening unit, fuel cell holder with the fuel cell inserted, and the lifting component.

As shown in FIG. 6, enclosed in the outer shell 100 is the heating assembly 200. The heating assembly 200 is comprised of a safety dome 201, a dampening unit 202, a fuel cell holder 203, and a fuel cell unit 204. In alternative embodiments, fan assembly 205 is also included. The safety dome 201 is a wire-framed dome structure that attaches to the upper end 206 of the fuel cell holder 203. The safety dome 201 is made of a metal alloy or material of the like. The dampening unit 202 is a flat, circular object that sits atop the fuel cell holder 203. The dampening unit 202 is roughly equal in circumference and shape to that of the upper end 206 of the fuel cell holder 203 and is made of a metal alloy or like material. Located on opposite ends of the dampening unit 202 are two handles 207. These handles 207 are used to position the dampening unit 202 atop the fuel cell holder 203 as shown in FIGS. 10 and 11. Additionally, the dampening unit 202 contains a plurality of openings 208 that allow the heat from the fuel cell unit 204 to pass through the device 1000.

The fuel cell holder 203 may be a hollow cylinder that houses the fuel cell unit 204. Ideally, the fuel cell holder 203 takes an identical shape of the upper chamber 101 of the outer shell 100. The fuel cell holder 203 also has a plurality of openings 209 that are surround the lower portion of the fuel cell holder 203 and extend from vertically down the exterior of the fuel cell holder 203. These openings 209 allow the user to adjust the height of the fuel cell unit 204 via the lifting components 105. The circumference of the fuel cell holder 203 must be large enough to house the fuel cell unit 204. Additionally, the fuel cell holder 203 is made of a ceramic material e.g. silicone. Enclosed in the fuel cell holder 203 is the fuel cell unit 204. The fuel cell unit 204, ideally, is in the form of a canister, i.e. a Sterno can or device of the like, that can be inserted into the fuel cell holder 203.

Figure 12:
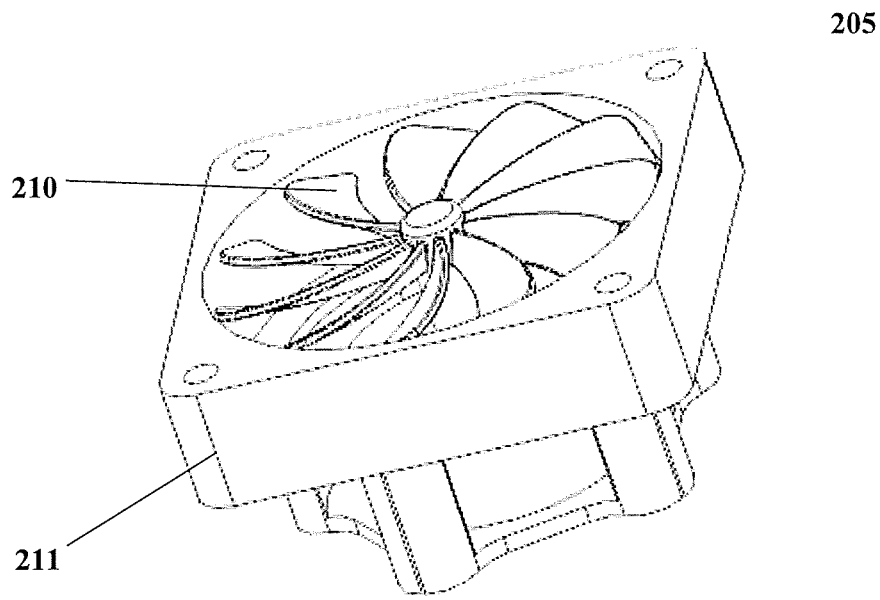
FIG. 12 shows an isometric view of the fan assembly.
Figure 13:
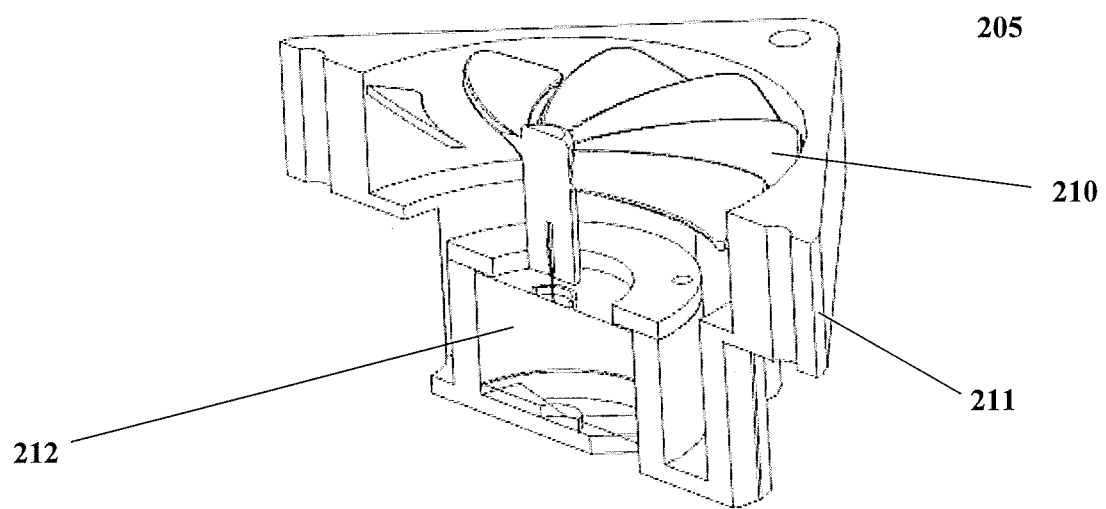
FIG. 13 shows a cross sectional view of the fan assembly.
Figure 14:
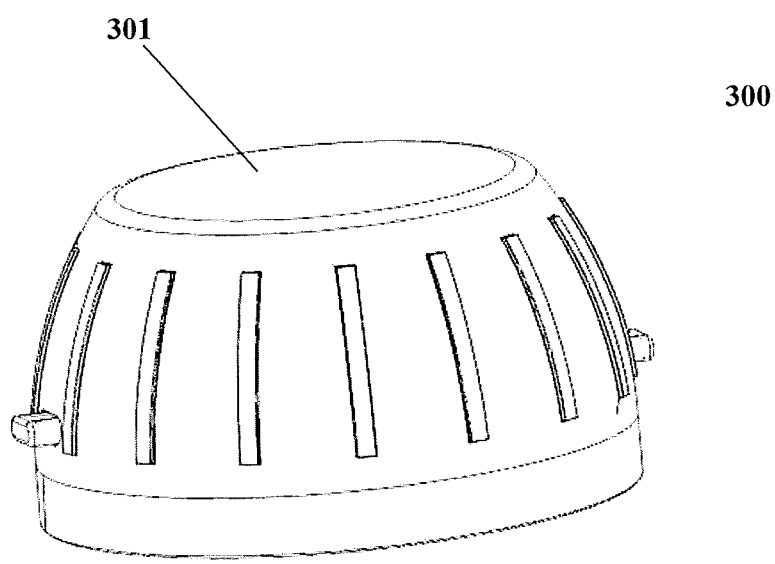
FIG. 14 shows an isometric view of the lid.
Figure 15:
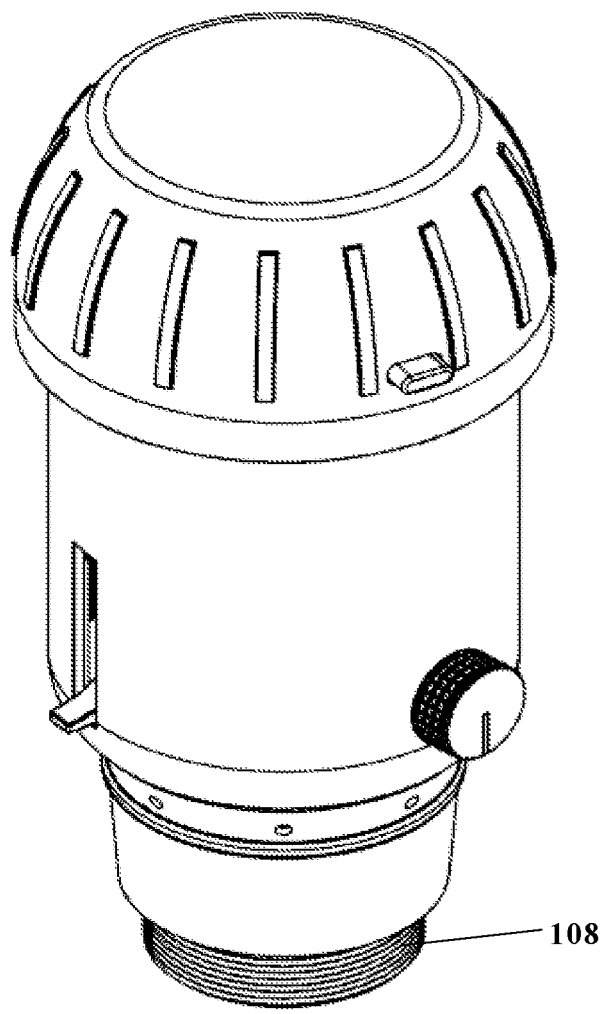
FIG. 15 shows an isometric view of the portable heating unit with the base of the outer shell removed.
Figure 15:
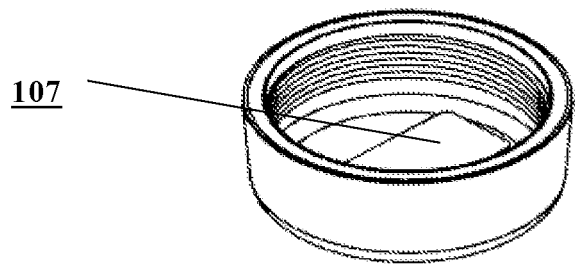

Lastly, as shown in FIGS. 12 and 13, the fan assembly 205 makes up the final component of the heating assembly 200. The fan assembly 205 is comprised of a fan 210, motor 212, and housing unit 211 to hold the fan 210 and motor 212. The housing unit 211 has no specific shape or size, so long as the internal dimensions are sufficient to house the motor 212 and fan 210 and not so large so that it does not fit within the upper chamber 101 of the outer shell 100. The housing unit 211 the fan 210 and motor 212 is made of suitable heat resistant material. Additionally, the fan 210 has no specific dimensions as long as the fan 210 can fit inside of the housing unit 211 the fan 210 and is made of any suitable heat resistant material.

The final component of the portable heating device 1000 is the lid 300. The lid 300 is a dome-shaped component that covers the safety dome 201. The lid 300 has no specific shape or size so long as it is sufficient to cover the safety dome 201. Additionally, the lid 300 must have a flat surface 301. This flat surface 301 allows the lid 300 to serve its second function. In addition to covering the safety dome 201 when not in use. As shown in FIG. 16, the lid 300 also attaches the base 107 of the outer shell 100 and serves as a stabilizing structure. The lid 300 is made of a heat resistant material e.g. silicon to prevent the absorption of heat from the safety dome 201 to the lid 300.

Use

The portable heating unit 1000 may be used in any manner known to those of ordinary skill in the art. By way of example, and without being limited to this disclosure, an individual may use the portable heating unit 1000 in the following manner: (i) removing the lid 300, safety dome 201 and dampening unit 202; (ii) placing the chosen fuel cell unit 204 in the fuel cell holder 203; (iii) igniting the fuel cell unit 204 (iv) reattaching the safety dome 201 and dampening unit 202 to the upper chamber 101; and (v) placing in the desired location for warmth.

As assembled, the portable heating unit 1000 functions as follows. The user inserts the fuel cell unit 204 into the opening 106 provided once the lid 300, safety dome 201 and dampening unit 202 are lifted or removed. Once removed, the user may insert the fuel cell unit 204. The fuel cell unit 204 is placed inside of the fuel cell holder 203 located within the upper chamber 101 of the outer shell 100. The user will ignite the fuel cell holder 203 and replace dampening unit 202 and safety dome 201 if he or she chooses. Once the safety dome 201 and dampening unit 202 are reattached, the user may place the portable heating unit 1000 in the desired location. That location may be inside of a golf cart, or in a hunting stand or shooting house. Once the portable heating unit 1000 is placed, the flame from the fuel cell 204 produces warmth that rises to the dampening unit 202 and is dispersed through the plurality of openings 209 located on the dampening unit 202, to provide heat and warmth for the user. The user may also use the fan 210 to increases circulation by adjusting the knob or tuner 104 located on the outer shell 100. Additionally, the user may adjust the heat by raising or lowering the fuel cell 204 by adjusting the lifting component 105.

While the invention has been described with respect to a limited number of embodiments, those skilled in the art, having benefit of this disclosure, will appreciate that other embodiments can be devised which do not depart from the scope of the invention as disclosed here.

CONCLUSION

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. These headings shall not limit or characterize the invention(s) set forth herein.

I claim:

1. A portable apparatus for radiant heat dispersion comprising: an outer shell that defines an upper chamber and a lower chamber; a lid; a heating assembly, a lifting component, wherein a heating assembly, an opening, and lifting component are provided in the upper chamber; and a power source, wherein the lower chamber defines a detachable base that includes the power source;
    wherein the heating assembly comprises a safety dome, a dampening unit, a fuel cell holder containing a plurality of openings, and a fuel cell unit that is provided in the fuel cell holder;
    wherein the lifting component is comprised of a handle and a lifting arm;
    wherein the lifting component extends through the outer shell and one of the plurality of openings located on the fuel cell holder;
    wherein the lifting arm abuts the fuel cell unit;
    wherein the lifting component moves vertically within the opening on the outer shell to adjust the depth of the fuel cell unit through one of the plurality of openings contained on the fuel cell holder.

2. The portable apparatus of claim 1, wherein the upper chamber has a diameter that is larger than the lower chamber.

3. The portable apparatus of claim 2, further comprising a dampening unit that is provided atop the heating unit.

4. The portable apparatus of claim 1, wherein the lifting component adjusts the depth of the fuel cell unit through the plurality of openings contained on the fuel cell holder.

5. The portable apparatus of claim 3, wherein the heating assembly further comprises a fan assembly.

6. The portable apparatus of claim 5, wherein:
the fuel cell holder defines an upper end;
the safety dome comprises a wire-framed dome structure that attaches to the upper end of the fuel cell holder.

7. The portable apparatus of claim 6, wherein the dampening unit sits atop the fuel cell holder.

8. The portable apparatus of claim 7, wherein:
the dampening unit defines a pair of handles, wherein the pair of handles are oppositely disposed;
wherein the pair of handles are configured to position the dampening unit atop the fuel cell holder.

9. The portable apparatus of claim 8, wherein the dampening unit defines a plurality of openings that allows heat from the fuel cell unit to escape.

10. The portable apparatus of claim 9, wherein the lid that covers the safety dome.

* * * * *